(12) United States Patent
Yanase et al.

(10) Patent No.: US 8,979,610 B2
(45) Date of Patent: Mar. 17, 2015

(54) METHOD FOR DRESSING THREADED GRINDING STONE FOR INTERNAL GEAR GRINDING

(75) Inventors: Yoshikoto Yanase, Tokyo (JP); Masashi Ochi, Tokyo (JP); Yasuhiro Nakamichi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 194 days.

(21) Appl. No.: 13/580,399

(22) PCT Filed: Oct. 6, 2010

(86) PCT No.: PCT/JP2010/067502
§ 371 (c)(1),
(2), (4) Date: Oct. 5, 2012

(87) PCT Pub. No.: WO2011/125246
PCT Pub. Date: Oct. 13, 2011

(65) Prior Publication Data
US 2013/0130598 A1   May 23, 2013

(30) Foreign Application Priority Data
Apr. 6, 2010   (JP) .................................. 2010-087436

(51) Int. Cl.
*B24B 53/075*   (2006.01)
*B24B 53/06*   (2006.01)

(52) U.S. Cl.
CPC ............. *B24B 53/075* (2013.01); *B24B 53/062* (2013.01)
USPC ............................................. 451/5; 451/47

(58) Field of Classification Search
CPC .......... B23F 5/163; B23F 23/006; B23F 1/02; B23F 13/006; B23F 5/02; B23F 9/02; B24B 53/085; B24B 53/075; B24B 53/12; B24B 19/00; B24B 31/00; B24B 33/04; B24B 33/06; B24B 33/081; B24B 49/03; B24B 5/00
USPC .................. 451/47, 5, 9, 10, 11, 56
See application file for complete search history.

(56) References Cited

U.S. PATENT DOCUMENTS 4,693,231 A * 9/1987 Buschmeier ............... 125/11.03

FOREIGN PATENT DOCUMENTS

| CN | 101778698 A | 7/2010 |
| EP | 2 177 316 A1 | 4/2010 |

(Continued)

OTHER PUBLICATIONS

Office Action for corresponding Taiwanese Application No. 099136312 mailed Aug. 30, 2013 and an English translation.

(Continued)

*Primary Examiner* — Robert Rose
(74) *Attorney, Agent, or Firm* — Birch, Stewart, Kolasch & Birch, LLP

(57) ABSTRACT

Disclosed is a method for dressing a threaded grinding stone for internal gear grinding, by which a threaded grinding stone for grinding an internal gear can be dressed with a high degree of accuracy by using a dressing gear that has been produced with a high degree of accuracy. In a state in which a barrel-shaped threaded grinding stone (11), which is disposed at an axial angle (Σ) to the internal gear (W) that is conferred during the grinding of said internal gear (W), and an external tooth-type dressing gear (13), which is capable of meshing with a virtual external gear (14) virtually formed in a manner so as to mesh with the internal gear (W) in place of the threaded grinding stone (11) disposed at the axial angle (Σ), have been meshed together, the threaded grinding stone (11) and the dressing gear (13) are simultaneously rotated while being moved relatively in a circular arc in the X-Y plane, whereby the dressing gear (13) dresses along the entire area in the axis direction of the threaded grinding stone (11).

1 Claim, 6 Drawing Sheets

(56) References Cited

FOREIGN PATENT DOCUMENTS

| JP | 61-131820 A | 6/1986 |
| JP | 7-32214 A | 2/1995 |
| JP | 8-510696 A | 11/1996 |
| JP | 2005-81472 A | 3/2005 |
| JP | 2009-45681 A | 3/2009 |
| TW | 2009-24906 A | 6/2009 |
| WO | WO 95/00276 A1 | 1/1995 |
| WO | WO 2009/025198 A1 | 2/2009 |

OTHER PUBLICATIONS

International Search Report and Written Opinion mailed Nov. 16, 2010 with English translation.
Chinese Office Action issued May 8, 2014 for corresponding Chinese Application No. 201080065090.2 with an English Translation.

* cited by examiner

Fig.5(a)   Fig.5(b)   Fig.5(c)
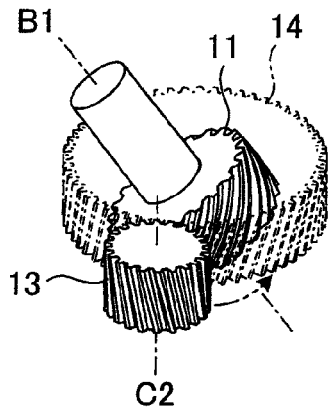
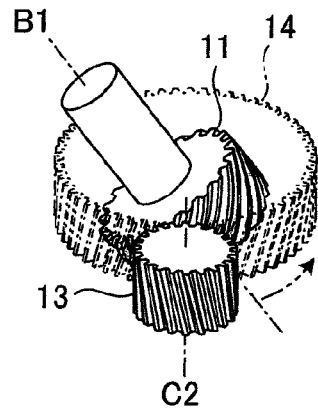
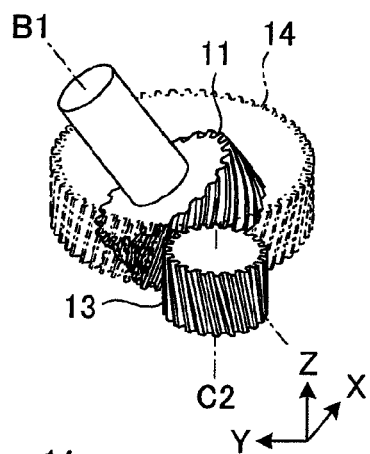
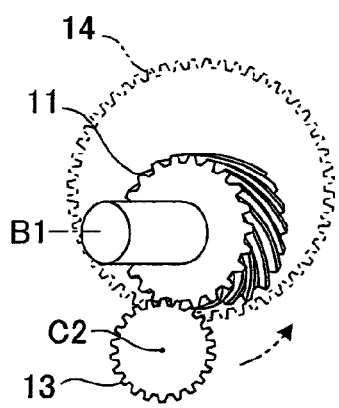
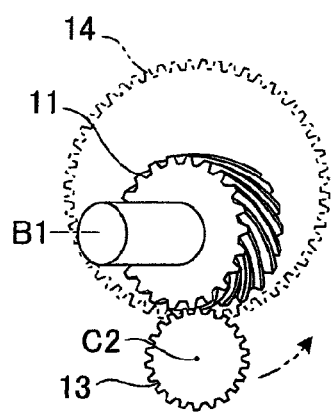
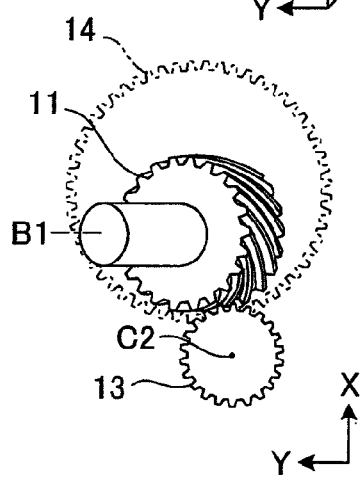
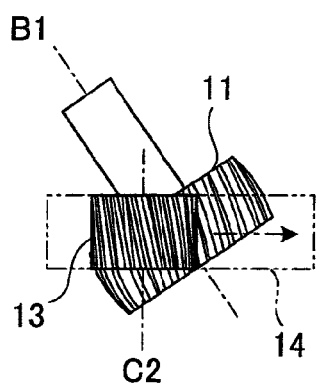
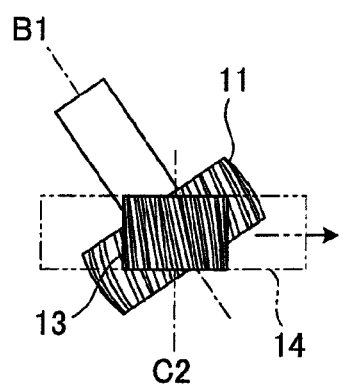
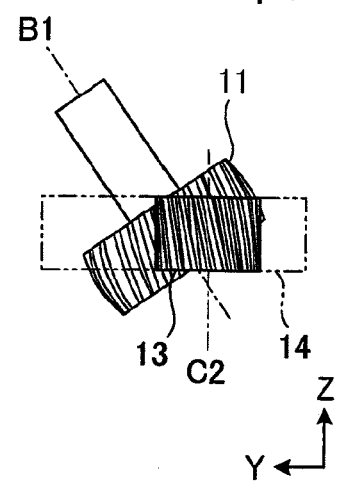

METHOD FOR DRESSING THREADED GRINDING STONE FOR INTERNAL GEAR GRINDING

TECHNICAL FIELD

The present invention relates to a method for dressing a threaded grinding wheel for internal gear grinding by which a threaded grinding wheel for grinding an internal gear can be dressed highly accurately.

BACKGROUND ART

In general, in the manufacturing of a gear, a predetermined gear blank is subjected to gear cutting to form a gear, and then heat treatment is performed on this cut gear. However, the tooth surface of the gear may not have a dimensional accuracy as required in some cases since performing the heat treatment on the gear as mentioned above causes strain and the like in the gear due to thermal stress. In such a case, the tooth surface of the gear is ground after the heat treatment to improve the dimensional accuracy.

To grind the gear, a grinding wheel for gear grinding is used. To dress this grinding wheel for gear grinding, a dressing gear is used as one of dressing tools. A dressing method using a dressing gear as above is disclosed in Patent Document 1, for example. Specifically, this Patent Document 1 discloses a dressing method in which a threaded grinding wheel for crown gear grinding and an externally-toothed dressing gear are rotated in synchronization with each other in a state of meshing with each other, while the dressing gear is moved in such a way as to traverse the threaded grinding wheel over the entire area thereof in the grinding wheel axis direction about the rotation axis of a pinion which can mesh with the crown gear.

PRIOR ART DOCUMENT

Patent Document

Patent Document 1: Published Japanese Translation of PCT International Application No. Hei 8-510696

SUMMARY OF THE INVENTION

Problems to be Solved by the Invention

Meanwhile, in a case of dressing a threaded grinding wheel for external gear grinding, there is generally used a dressing gear whose gear specifications are set to be almost the same as the gear specifications of the external gear after finishing. Likewise, in a case of dressing a threaded grinding wheel for internal gear grinding as well, there is used a dressing gear whose gear specifications are set to be almost the same as the gear specifications of the internal gear after finishing.

Since the accuracy of gear finishing with a grinding wheel is affected by the accuracy of its dressing gear, it is preferable to manufacture the dressing gear with high accuracy. However, dressing gears for dressing a threaded grinding wheel for internal gear grinding have more complicated edge profiles than those of dressing gears for dressing a threaded grinding wheel for external gear grinding since the threaded grinding wheel for internal gear grinding contacts its internal gear from inside. Thus, the former dressing gears are accordingly difficult to manufacture with high accuracy.

In other words, the dressing method according to Patent Document 1 mentioned above aims at dressing a threaded grinding wheel for external gear grinding highly accurately by using a dressing gear manufactured highly accurately, and does not aim at dressing a threaded grinding wheel for internal gear grinding highly accurately by using a dressing gear manufactured highly accurately.

Accordingly, the present invention has been made to solve the above-described problem, and an object thereof is to provide a method for dressing a threaded grinding wheel for internal gear grinding by which a threaded grinding wheel for grinding an internal gear can be dressed highly accurately by using a dressing gear manufactured highly accurately.

Means for Solving the Problems

A method for dressing a threaded grinding wheel for internal gear grinding of a first invention for solving the above problem is characterized in that a barrel-shaped threaded grinding wheel and an externally-toothed dressing gear are rotated in synchronization with each other and moved relative to each other in an arc within a plane in a state where the threaded grinding wheel and the dressing gear are in mesh with each other, so as to cause the dressing gear to dress the threaded grinding wheel over an entire area thereof in a direction of an axis of the grinding wheel, the threaded grinding wheel being disposed at a crossed axes angle to an internal work gear which is given to the threaded grinding wheel during grinding of the internal work gear, the dressing gear being capable of meshing with a virtual external gear which is virtually designed to mesh with the internal work gear in place of the threaded grinding wheel disposed at the crossed axes angle.

The method for dressing a threaded grinding wheel for internal gear grinding of a second invention for solving the above problem is characterized in that the virtual external gear is virtually created as an external gear whose solid parts are exactly the same as shapes of tooth spaces of the internal work gear, and the dressing gear is moved in mesh with the virtual external gear in a case of moving the dressing gear in the arc within the plane.

Effect of the Invention

Thus, according to the method for dressing a threaded grinding wheel for internal gear grinding according to the present invention, there is used the externally-toothed dressing gear which can mesh with the virtual external gear virtually designed to mesh with the internal work gear in place of the threaded grinding wheel disposed in an inclining posture. Hence, the threaded grinding wheel can be dressed highly accurately.

BRIEF DESCRIPTION OF THE DRAWINGS

FIG. 5 shows a method for dressing a threaded grinding wheel for internal gear grinding according to an embodiment of the present invention. Part (a) is a view showing how the dressing gear meshes with a portion of the threaded grinding wheel at a dressing start position. Part (b) is a view showing how the dressing gear meshes with a portion of the threaded grinding wheel at a dressing intermediate position. Part (c) is a view showing how the dressing gear meshes with a portion of the threaded grinding wheel at a dressing end position.

MODES FOR CARRYING OUT THE INVENTION

Figure 1:
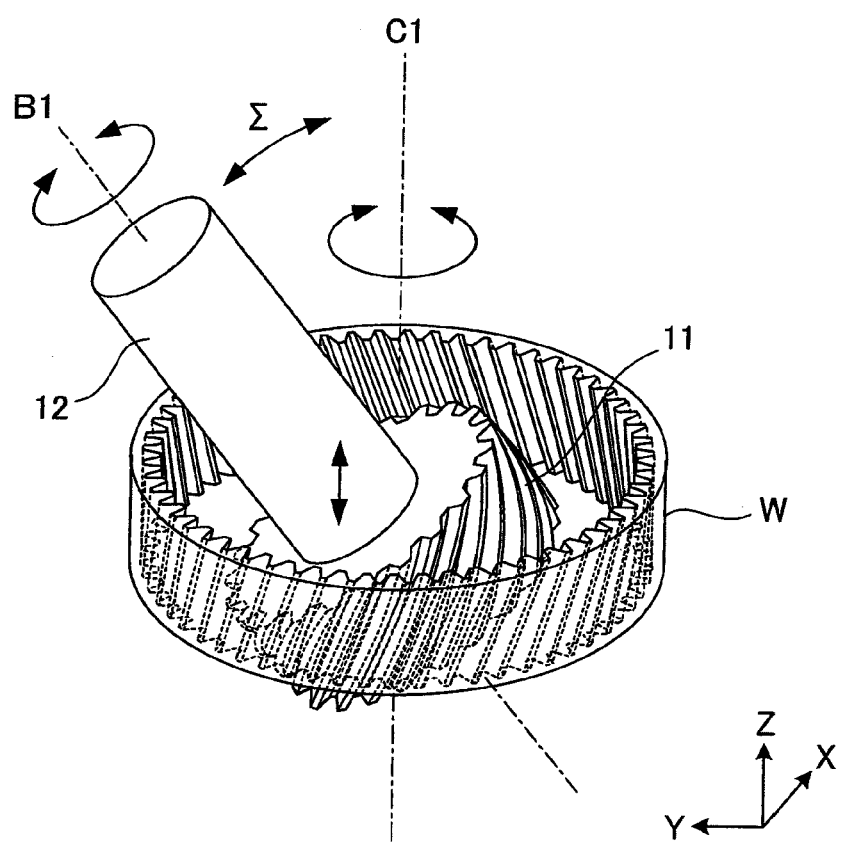
FIG. 1 is a view showing how a threaded grinding wheel and an internal gear mesh with each other.
Figure 2:
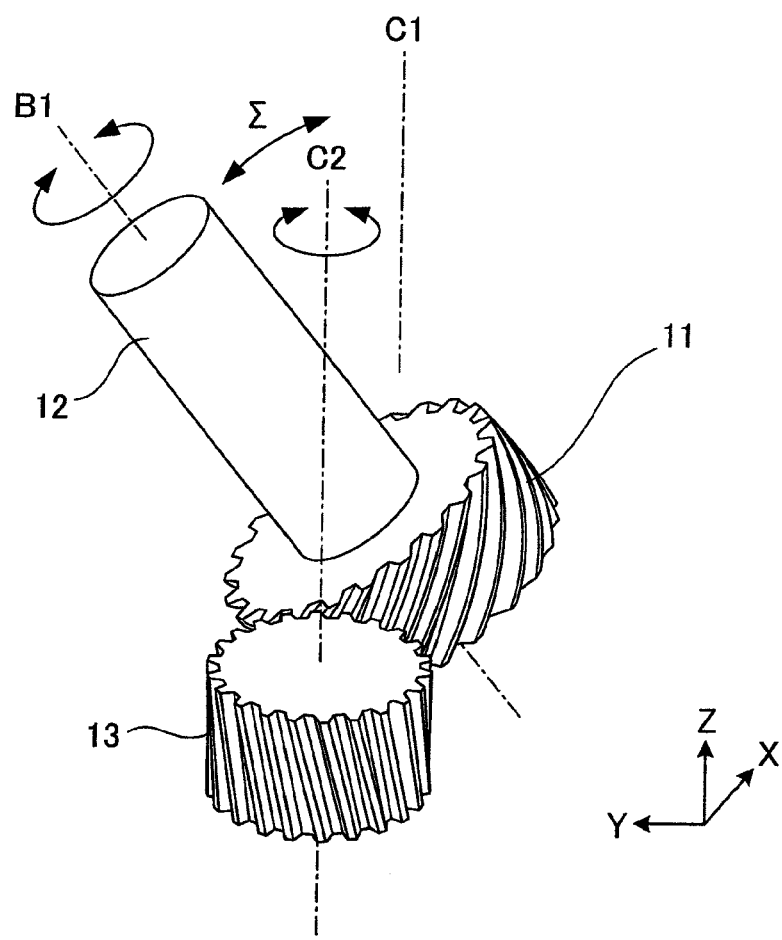
FIG. 2 is a view showing how a dressing gear and the threaded grinding wheel mesh with each other.

Hereinbelow, methods for dressing a threaded grinding wheel for internal gear grinding according to the present invention will be described in detail by using the drawings. Embodiments An internal gear grinding machine (unillustrated) employing a dressing method according to the present invention is configured to grind an internal gear (internal work gear) W, which is a helical gear, with a barrel-shaped threaded grinding wheel 11 as shown in FIG. 1. Further, as shown in FIG. 2, the internal gear grinding machine has a dressing function to dress the threaded grinding wheel 11 with an externally-toothed dressing gear 13 on the machine.

As shown in FIG. 1, in the internal gear grinding machine, the internal gear W is mounted rotatably about a vertical (Z-axis direction) workpiece rotation axis C1. Note that the internal gear W has undergone heat treatment and cured after its gear cutting and has predetermined internal gear specifications.

Moreover, in the internal gear grinding machine, a grinding wheel arbor 12 is supported rotatably about a grinding wheel rotation axis B1, and is also supported movably in a horizontal direction in which the inter-axis distance between the grinding wheel rotation axis B1 and the workpiece rotation axis C1 is adjusted (hereinafter, referred to as X-axis direction), in a horizontal direction perpendicular to the X-axis direction and a Z-axis direction (hereinafter, referred to as Y-axis direction), and in the Z-axis direction. Moreover, the threaded grinding wheel 11, which can mesh with the internal gear W, is mounted at the tip of the grinding wheel arbor 12. Thus, the threaded grinding wheel 11 can be moved and rotated together with the grinding wheel arbor 12 by moving the grinding wheel arbor 12 in the X-, Y-, and Z-axis directions and rotating the grinding wheel arbor 12 about the grinding wheel rotation axis B1.

Further, the grinding wheel arbor 12 is supported turnably about an unillustrated grinding wheel pivot extending in the X-axis direction. Thus, the turn angle (inclination angle) of the grinding wheel rotation axis B1 can be changed by turning the grinding wheel arbor 12 about the grinding wheel pivot. In this way, the crossed axes angle between the grinding wheel rotation axis B1 and the workpiece rotation axis C1 (hereinafter, referred to as axial angle $\Sigma$) can be adjusted. Specifically, during grinding, the threaded grinding wheel 11 rotates about the grinding wheel rotation axis B1 which crosses the workpiece rotation axis C1 of the internal gear W at the axial angle $\Sigma$.

Figure 3:
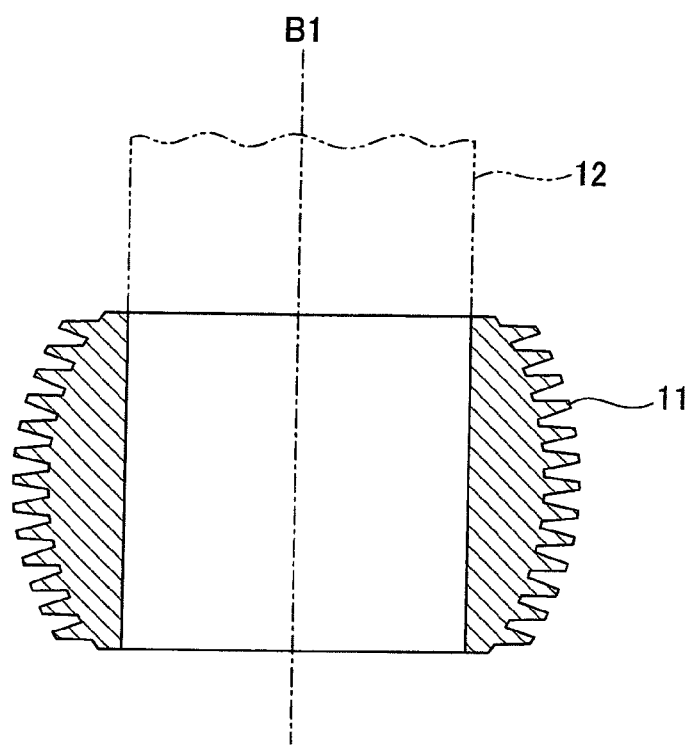
FIG. 3 is a vertical cross-sectional view of the threaded grinding wheel.

Meanwhile, as shown in FIG. 3, the threaded grinding wheel 11 is formed in such a barrel shape that its radial dimension decreases gradually from an intermediate portion thereof in the grinding wheel axis direction (the grinding wheel width direction) toward both ends thereof in the grinding wheel axis direction). Moreover, each thread of the threaded grinding wheel 11 is formed spirally, and on the surface thereof, an edge surface (grinding surface) for grinding the tooth surface of the internal gear W is formed over the entire area of the threaded grinding wheel 11 in the grinding wheel axis direction continuously in a twisting fashion. By forming the threaded grinding wheel 11 in a barrel shape as described, the threaded grinding wheel 11 disposed at the axial angle $\Sigma$ can mesh with the internal gear W. Note that the threaded grinding wheel 11 has grinding wheel specifications that allow the threaded grinding wheel 11 to appropriately mesh with the internal gear W.

Further, as shown in FIG. 2, in the internal gear grinding machine, the dressing gear 13 is supported rotatably about a gear rotation axis C2 parallel to the Z-axis direction, and also supported movably in the X-axis direction (a horizontal direction in which the inter-axis distance between the grinding wheel rotation axis B1 and the gear rotation axis C2 is adjusted), the Y-axis direction, and the Z-axis direction.

Figure 4:
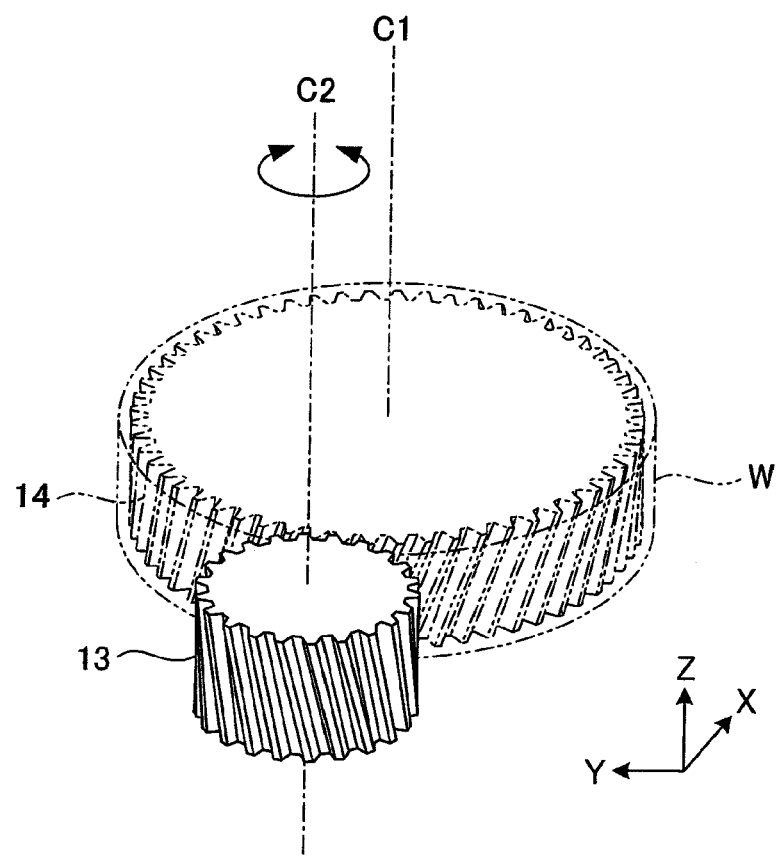
FIG. 4 is a view showing how a virtual external gear and the dressing gear mesh with each other.
Figure 6A:
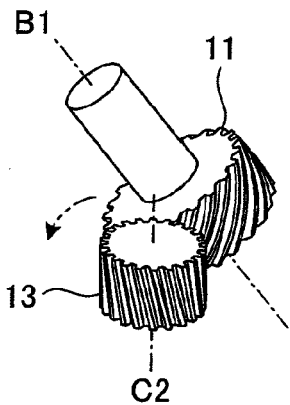
FIG. 6 shows a method for dressing a threaded grinding wheel for internal gear grinding according to another embodiment of the present invention. Part (a) is a view showing how the portion of the threaded grinding wheel at the dressing start position meshes with the dressing gear. Part (b) is a view showing how the portion of the threaded grinding wheel at the dressing intermediate position meshes with the dressing gear. Part (c) is a view showing how the portion of the threaded grinding wheel at the dressing end position meshes with the dressing gear.
Figure 6B:
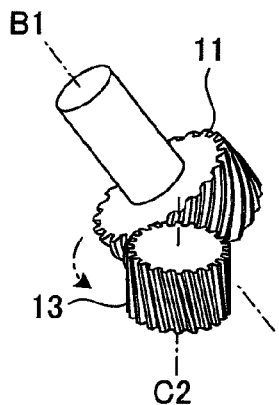
Figure 6C:
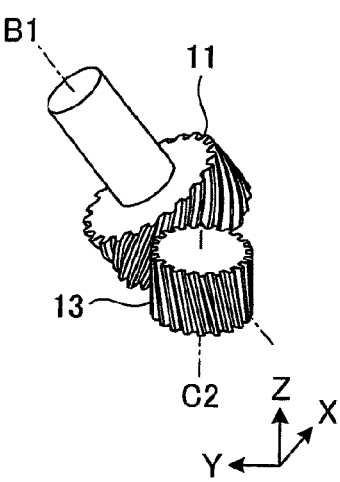
Figure 6C:
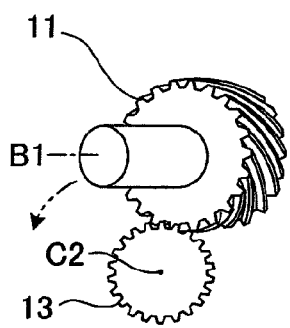
Figure 6C:
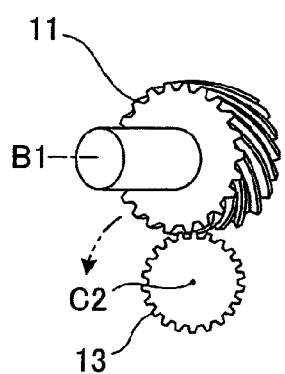
Figure 6C:
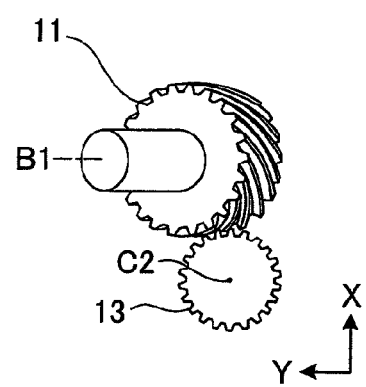
Figure 6C:
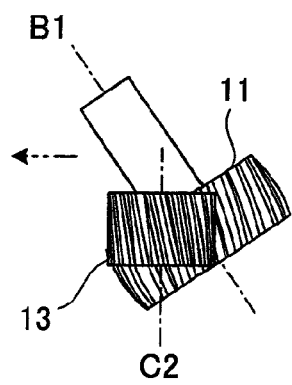
Figure 6C:
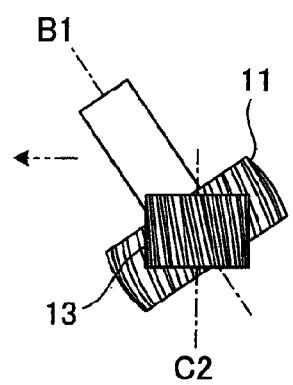
Figure 6C:
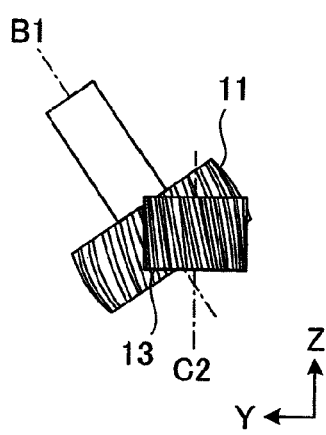

Here, while the dressing gear 13 is an externally-toothed tool configured to mesh with and dress the threaded grinding wheel 11, the dressing gear 13 can also mesh with a virtual external gear 14 which is a helical gear that meshes with the internal gear W from inside, as shown in FIG. 4. This virtual external gear 14 is virtually created as an external gear having all its tooth parts and tooth spaces configured to mesh with all the tooth parts and tooth spaces of the internal gear W at the same time. In other words, the virtual external gear 14 is virtually created as an external gear whose solid parts (tooth parts) are exactly the same as the shapes of the tooth spaces of the internal gear W. Thus, the center of the virtual external gear 14 coincides with the workpiece rotation axis C1 of the internal gear W.

Specifically, in the grinding of the internal gear W with the threaded grinding wheel 11, the threaded grinding wheel 11 rotates while meshing with the internal gear W in a state of inclining at the axial angle $\Sigma$. By setting the virtual external gear 14, the meshing state between the threaded grinding wheel 11 and the internal gear W can be replaced with a meshing state between the virtual external gear 14 and the internal gear W. Here, the tooth profile of the virtual external gear 14 is the same as a projected edge profile (tooth profile) obtained by projecting the edge profile of the threaded grinding wheel 11 inclining at the axial angle $\Sigma$ onto an X-Y plane (horizontal plane).

Accordingly, the tooth profile of the dressing gear 13 (dressing gear specifications) for dressing the threaded grinding wheel 11 can be set easily from the tooth profile of the internal gear W (internal gear specifications) to be machined, through the tooth profile of the virtual external gear 14 (virtual external gear specifications). Moreover, the edge profile of the threaded grinding wheel 11 (grinding wheel specifications) can be set easily from the tooth profile of the virtual external gear 14 (virtual external gear specifications).

Thus, in the grinding of the internal gear W with the threaded grinding wheel 11, firstly, the grinding wheel arbor 12 is turned about the grinding wheel pivot to dispose the threaded grinding wheel 11 at the axial angle $\Sigma$ that corresponds to the helix angle of the internal gear W, as shown in FIG. 1.

Thereafter, the threaded grinding wheel 11 disposed at the axial angle $\Sigma$ is moved in the X-, Y-, and Z-axis directions to mesh with the internal gear W.

Then, from this meshing state, the internal gear W is rotated about the workpiece rotation axis C1 while the threaded grinding wheel 11 is rotated about the grinding wheel rotation axis B1 and swung in the Z-axis direction. As a result, the synchronous meshing rotation of the internal gear W and the threaded grinding wheel 11 and the axial angle Σ cause a slip between the threaded grinding wheel 11 and the internal gear W. Accordingly, the edge surface of the threaded grinding wheel 11 minutely grinds the tooth surface of the internal gear W.

Meanwhile, grinding a certain quantity of internal gears W with the threaded grinding wheel 11 wears the edge surface thereof and lowers the sharpness. Thus, the threaded grinding wheel 11 is dressed periodically with the dressing gear 13.

Then, to dress the threaded grinding wheel 11 with the dressing gear 13, firstly, the threaded grinding wheel 11 is disposed at the axial angle Σ, which has been set at the time of grinding the internal gear W, as shown in Part (a) of FIG. 5. Thereafter, the dressing gear 13 is moved in the X-, Y-, and Z-axis directions to mesh with an upper end portion, in the grinding wheel axis direction, of the threaded grinding wheel 11 which is a dressing start position.

Then, from this meshing state, the threaded grinding wheel 11 is rotated about the grinding wheel rotation axis B1 while the dressing gear 13 is rotated about the gear rotation axis C2 and moved in the X- and Y-axis directions. As a result, the dressing gear 13 is moved within the X-Y plane in an arc about the workpiece rotation axis C1 of the internal gear W and the center axis of the virtual external gear along the outer shape (outline) of the threaded grinding wheel 11.

Specifically, as shown in Parts (a) to (c) of FIG. 5, the dressing gear 13 is caused to mesh with the threaded grinding wheel 11 over the entire area thereof in the grinding wheel axis direction from the upper end portion of the threaded grinding wheel 11 in the grinding wheel axis direction, which is the dressing start position, through an intermediate portion of the threaded grinding wheel 11 in the grinding wheel axis direction, which is a dressing intermediate position, to a lower end portion of the threaded grinding wheel 11 in the grinding wheel axis direction, which is a dressing end position. As a result, the tooth surface (edge surface) of the dressing gear 13 continuously dresses the twisted edge surface of the threaded grinding wheel 11 from the upper to lower end portions thereof in the grinding wheel axis direction.

In this action, since the projected edge profile of the threaded grinding wheel 11 inclining at the axial angle Σ is set to be the same as the tooth profile of the virtual external gear 14, the dressing gear 13 is moved within the X-Y plane as if it is in mesh with the virtual external gear 14 and moved in an arc along the outer circumference of the virtual external gear 14. Accordingly, the threaded grinding wheel 11 can be dressed highly accurately.

Note that while the threaded grinding wheel 11 is dressed in the above embodiment by moving the dressing gear 13 with respect to the threaded grinding wheel 11 disposed at the axial angle Σ, the threaded grinding wheel 11 may be dressed in the opposite manner by moving the threaded grinding wheel 11 disposed at the axial angle Σ with respect to the dressing gear 13.

Specifically, as shown in Part (a) of FIG. 6, the threaded grinding wheel 11 is disposed at the axial angle Σ which has been set at the time of grinding the internal gear W. Thereafter, the threaded grinding wheel 11 is moved in the X-, Y-, and Z-axis directions to mesh with the dressing gear 13 at the upper end portion, in the grinding wheel axis direction, of the threaded grinding wheel 11 which is the dressing start position.

Then, from this meshing state, the dressing gear 13 is rotated about the gear rotation axis C2 while the threaded grinding wheel 11 is rotated about the grinding wheel rotation axis B1 and moved in the X- and Y-axis directions. As a result, the threaded grinding wheel 11 is moved within the X-Y plane in an arc along the outer shape (outline) of the dressing gear 13.

Specifically, as shown in Parts (a) to (c) of FIG. 6, the threaded grinding wheel 11 is caused to mesh with the dressing gear 13 over the entire area of the threaded grinding wheel 11 in the grinding wheel axis direction from the upper end portion in the grinding wheel axis direction, which is the dressing start position, through the intermediate portion in the grinding wheel axis direction, which is the dressing intermediate position, to the lower end portion in the grinding wheel axis direction, which is the dressing end position. As a result, the tooth surface of the dressing gear 13 continuously dresses the twisted edge surface of the threaded grinding wheel 11 from the upper to lower end portions thereof in the grinding wheel axis direction.

Thus, according to the dressing method according to the present invention, the threaded grinding wheel 11, which is disposed at the axial angle Σ that has been set at the time of grinding the internal gear W, and the dressing gear 13, which is capable of meshing with the virtually-created virtual external gear 14 in place of the threaded grinding wheel 11, are rotated in synchronization with each other and moved relative to each other in an arc within the X-Y plane in a state of meshing with each other, so as to cause the dressing gear 13 to dress the threaded grinding wheel 11 over the entire area thereof in the grinding wheel axis direction. Accordingly, the threaded grinding wheel 11 can be dressed highly accurately with the dressing gear 13 manufactured highly accurately.

Moreover, the dressing gear 13 for dressing the threaded grinding wheel 11 is an externally-toothed type. This not only enhances the freedom in selecting the dressing gear but also enables easy and highly accurate manufacturing of the dressing gear 13 regardless of the size of the threaded grinding wheel 11.

INDUSTRIAL APPLICABILITY

The present invention is applicable to a method for dressing a threaded grinding wheel for gear grinding which aims at improving the life of the threaded grinding wheel by allowing effective use of the entire area of the grinding wheel in the grinding wheel axis direction.

The invention claimed is:

1. A method for dressing a threaded grinding wheel for internal gear grinding characterized in that a barrel-shaped threaded grinding wheel and an externally-toothed dressing gear are rotated in synchronization with each other and moved relative to each other in an arc within a plane in a state where the threaded grinding wheel and the dressing gear are in mesh with each other, so as to cause the dressing gear to dress the threaded grinding wheel over an entire area thereof in a direction of an axis of the grinding wheel, the threaded grinding wheel being disposed at a crossed axes angle to an internal work gear which is given to the threaded grinding wheel during grinding of the internal work gear, the dressing gear being capable of meshing with a virtual external gear which is virtually designed to mesh with the internal work gear in place of the threaded grinding wheel disposed at the crossed axes angle, the virtual external gear is virtually created as an external gear in which all tooth parts are exactly the same as shapes of all tooth spaces of the internal work gear, and the dressing gear is moved in mesh with the virtual external gear when the dressing gear is moved in the arc within the plane.

* * * * *